May 3, 1949.  R. T. BREYMEIER  2,468,804

FLUID COOLED GAS BLANKETED ARC WELDING TORCH

Filed July 13, 1945  2 Sheets-Sheet 1

INVENTOR
RUDOLPH T. BREYMEIER
BY
*Greenewald*
ATTORNEY

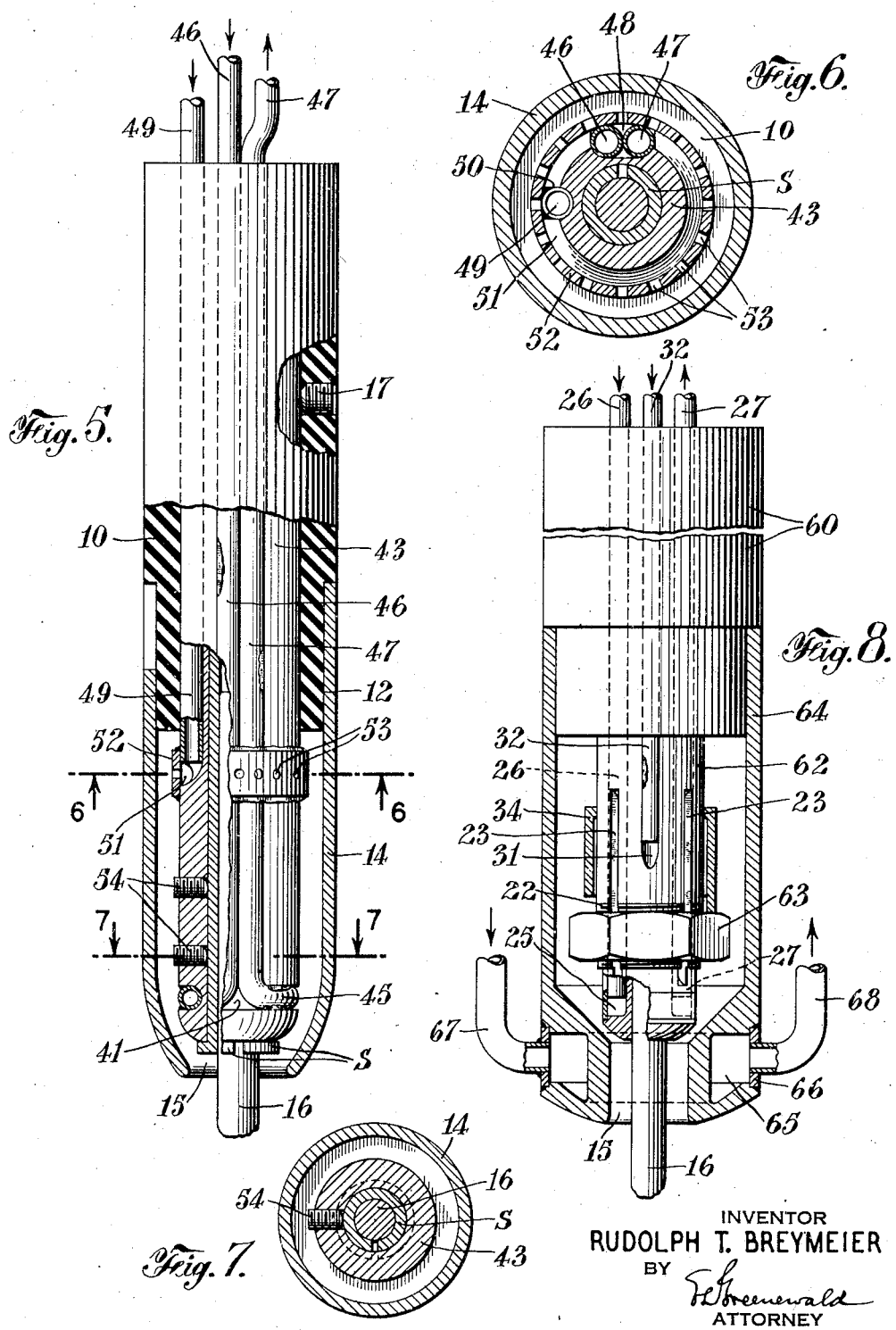

Patented May 3, 1949

2,468,804

UNITED STATES PATENT OFFICE 2,468,804

FLUID-COOLED GAS BLANKETED ARC-WELDING TORCH

Rudolph T. Breymeier, Niagara Falls, N. Y., assignor to The Linde Air Products Company, a corporation of Ohio Application July 13, 1945, Serial No. 604,834

10 Claims. (Cl. 219—15)

This invention relates to welding torches of the inert gas-blanketed arc type.

The use of a protective blanket of inert gas about the zone of arc welding operation has found especial merit in the welding of aluminum, magnesium, and their alloys, and also stainless steel. Several types of torches are employed in such welding, for example, those disclosed by Meredith in U. S. Patents Nos. 2,342,086 and 2,376,265, in the use of which an arc is struck between the work and a tungsten electrode axially disposed within an appropriate gas feeding nozzle, the outlet in the nozzle serving both the electrode and the inert gas.

With the extension of the process to the welding of larger and larger bodies, the torches have been enlarged to provide the necessarily greater current-carrying capacity. But this cannot be carried very far before the torch becomes too bulky for practical use. It is therefore an object of the present invention to provide a torch which permits the employment of a larger diameter electrode, with the desired greater current-carrying capacity, without a substantial enlargement of the torch assembly.

When welding with direct current of reverse polarity, which is preferred in joining non-ferrous materials such as aluminum, magnesium, and their alloys, there exists a tendency for the electrode tip to overheat due to resistance to current flow, heat radiation from the hot workpiece, and bombardment by electrons from the latter. This tendency is less pronounced when straight polarity direct current is employed, except when relatively large bodies are being welded and the required current is high, and represents a limiting factor in the construction of the torch. It is therefore a further object of the present invention to provide means for cooling the torch and preferably for cooling the electrode.

Other objects and features of novelty will be apparent from the following description and accompanying drawings, in which:

Fig. 5 is a view similar to Fig. 1, but showing a modified construction;

Fig. 6 is a horizontal section taken along the line 6—6 of Fig. 5;

Fig. 7 is a horizontal section taken along the line 7—7 of Fig. 5; and

Fig. 8 is a vertical section showing a further modification.

Figure 1:
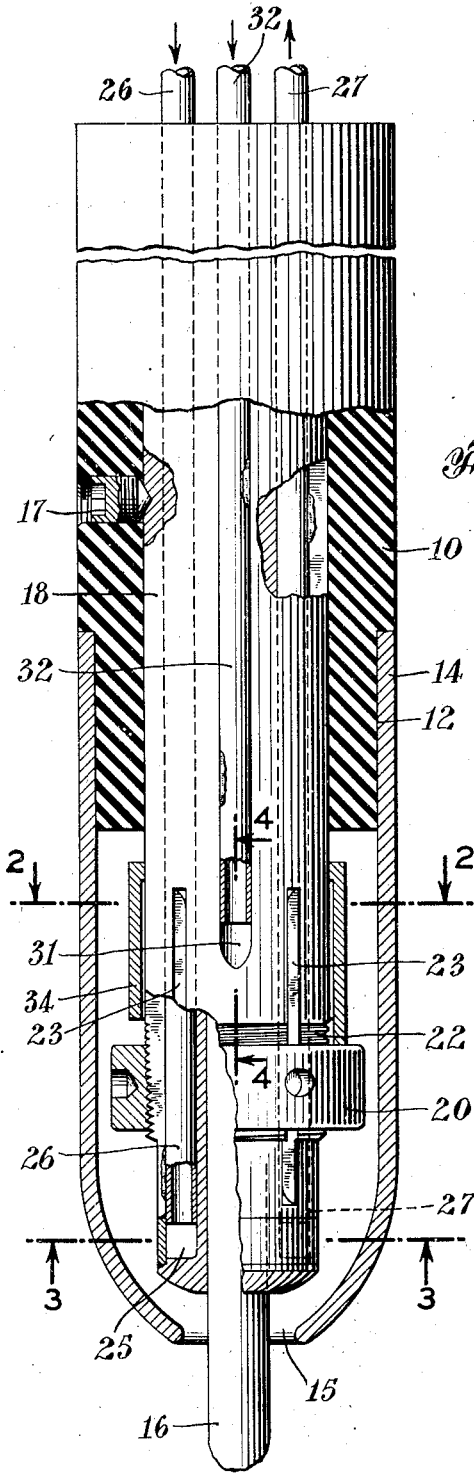
Fig. 1 is an elevation, with parts broken away and shown in vertical sections, of a torch according to the preferred embodiment of the invention.

In the embodiment of the invention illustrated in Fig. 1 the torch comprises a hollow insulating handle 10, of plastic or other suitable electrical insulating material, provided with a reduced diameter end 12, over which is fitted a nozzle 14, preferably a hollow steel gas shield of generally frusto-ogival form, and having an outlet opening 15, which constitutes the discharge orifice for the inert gas. A refractory electrode 16, preferably of tungsten or molybdenum, protrudes centrally through this aperture.

Mounted within the insulating handle 10 and extending into the nozzle 14, and held rigid, for example by a set screw 17, is an electrically-conductive electrode support sleeve 18, the inner wall of which encases the electrode 16. The electric welding current is supplied to the sleeve 18 in the manner described in the Meredith patents hereinbefore referred to. As the electrode wears away, as by volatilization of the tungsten, it may be drawn forward sufficiently to compensate for such loss. The engagement of the support sleeve 18 with the electrode is regulated by a clamping nut 20 which engages a tapered thread 22 on the support sleeve 18. The forward position of the support sleeve is provided with four symmetrically arranged slots 23, which extend through the wall thereof. Thus, upon turning the nut 20 in a clockwise direction, for example, the walls of the support sleeve are drawn together to grip the electrode.

Figure 2:
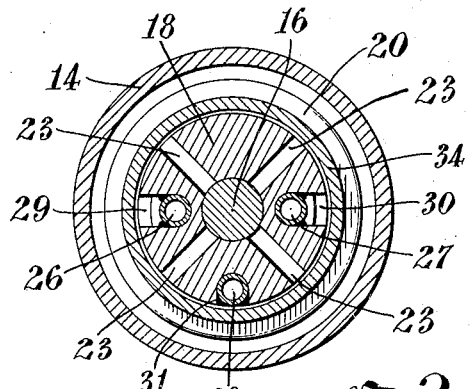
Fig. 2 is a horizontal section taken along the line 2—2 of Fig. 1.
Figure 3:
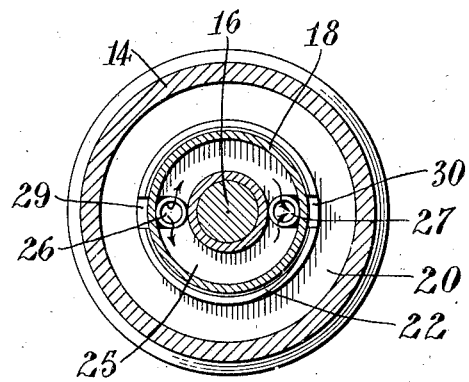
Fig. 3 is an inverted horizontal section taken along the line 3—3 of Fig. 1.
Figure 4:
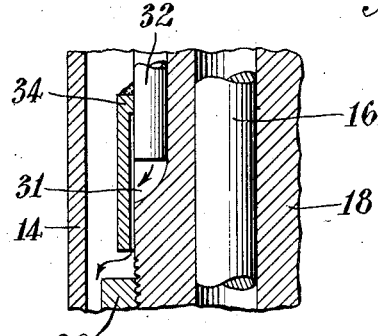
Fig. 4 is a detail of a portion of Fig. 1, taken in vertical section along the line 4—4 thereof.

Located in the electrode support sleeve adjacent its forward end, is a coolant chamber 25 which extends circumferentially around the sleeve and communicates with the coolant inlet and outlet tubes 26 and 27 respectively, by means of which a suitable cooling medium such as water may be circulated through the cooling chamber. These tubes extend down the length of the support sleeve to the coolant chamber, being disposed in two diametrically opposite grooves 29 and 30 in the sleeve 18 (Fig. 2), of appropriate depth and curvature to accommodate them with maximum contact between the tubes and the groove walls. Additionally, a third groove 31 of lesser depth than the coolant-tube-carrying grooves, and 90° therefrom, extends approximately half-way down the length of the electrode support sleeve. This groove accommodates the inert gas inlet tube 32.

Best results are obtained when the groove 31 corresponds in depth and width to the diameter of the tube 32, and the minor gaps caused by lack of coincidence of the periphery of the tube 32 and the walls of the groove are closed as by soldering or welding. To insure maximum heat transfer and hence maximum cooling of the assembly, the water inlet and outlet tubes are preferably soldered into the respective grooves.

It has been found desirable to loosely surround with a metal skirt 34 that portion of the electrode support sleeve 18 in the immediate proximity of the outlet end of the inert gas tube 32, thus securing a substantially uniform distribution of the gas around the electrode, particularly at the opening 15 where the latter emerges from the nozzle 14.

In Fig. 5 is illustrated a modification of the invention which has certain advantages in simplicity of construction and lower cost. Adjacent its forward end, the electrode support sleeve 43 is provided with a groove 41 which accommodates an annular loop 45 of the coolant tube, the curvature at the base of said groove being substantially such as to insure a semi-circumferential contact with the coolant tube loop, thus effecting maximum heat transfer from the sleeve without introducing expensive machine work in preparing a built-in coolant chamber. The coolant enters the torch through an inlet length 46 of the coolant tube, passes through the annular loop 45 and returns through an outlet length 47. The inlet and outlet lengths 46 and 47 are brought together in contacting relation and fitted into a double groove 48, extending longitudinally of the support sleeve 43. Here again, the coolant tube is preferably soldered into the groove.

The inert gas enters the torch through the tube 49, which is disposed in a groove 50 in the electrode support sleeve 43, extending somewhat more than half-way down the length of such sleeve. The tube opens into a groove 51 covered by the perforated gas distributor collar 52, the multiplicity of ports 53 insuring a uniform blanket of inert gas about the electrode.

Maximum heat-exchange contact may be conveniently obtained when there is employed an electrically conductive split sleeve S that fits within the electrode support guide sleeve 43, and is held rigid in the central guideway of the support sleeve 43 by two set screws 54. Pressure of the set screws 54 on the split sleeve S urges the latter into pressing relationship with the electrode. Each electrode size will preferably require a different sleeve, but in this manner a given torch may be made to accommodate a variety of electrode sizes. Release of the said screws permits the drawing down of the electrode when necessary to compensate for loss thereof during welding. More uniform cooling of the electrode is probably obtained with the construction of Figs. 1 to 4 inclusive, since the electrode therein is always centered in the support sleeve and in contact with a large portion of the inner surface thereof, whereas in the case of the torch shown in Fig. 5 the set screws displace the electrode from its central position.

In the two torches illustrated, the location of the point of application of the cooling agency is a significant feature. In both instances, this lies between the electrode tip and the clamping means for holding the electrode in the support sleeve. The thermal expansion coefficients of the materials used in construction of a welding torch, for example, steel and copper, are different, and as the clamping portion of the apparatus warms or heats up during welding, the various parts thereof will expand differentially and the electrode may become loosened and drop from the torch.

By proper cooling, as in the torch herein disclosed, this differential expansion factor is eliminated or reduced to a minimum. Also, the cooling means is applied at a point as close to the electrode end as is practicable with this type of torch, namely, immediately within the nozzle or gas shield. The temperature of the tungsten is thus kept within safe operating limits.

Using a torch constructed according to Figs. 1 to 6 inclusive, in an argon atmosphere it has been possible to weld continuously with a ⅜-inch electrode at up to 280 amperes, using direct current with reverse polarity, a feat quite impossible with torches of conventional designs.

When welding with high currents, where considerable heat radiation from the weld zone occurs, it may be desirable to water cool the nozzle as illustrated in Fig. 8, as well as the electrode support sleeve. In this form the torch has an insulating handle 60, an electrode support sleeve 62, clamping nut 63 and nozzle 64. The sleeve 62 is provided with inert gas supply means, cooling water tubes and electrode clamping means similar to those illustrated in Figs. 1 to 4. The nozzle 64 has formed therein an annular groove 65, which is closed by a sleeve 66 in fluid tight relation. Coolant fluid is supplied by an inlet pipe 67, circulates through the coolant chamber formed by an annular groove 65, and is conducted away by an outlet pipe 68. Both the inlet pipe 67 and the outlet pipe 68 are mounted outside of the nozzle 64.

In a particular ⅜-inch electrode torch of conventional design, in an argon atmosphere, the melting of the tip was the limiting factor if the torch was used for only short periods, but even at relatively low currents the torch assembly overheated on continuous use. By replacing the gas shield of such torch with a shield provided with a water-cooled gas aperture as shown in Fig. 8, the short period current limitation was raised about 50 amperes on direct current reverse polarity welding.

The method disclosed herein is claimed in my divisional application Serial No. 687,361 filed July 31, 1946.

What is claimed is:

1. In a gas blanketed arc welding torch, an electrically conductive electrode support sleeve, electrically conductive electrode gripping means mounted on said sleeve, means for supplying electric welding current through said support sleeve and gripping means to the electrode, a gas confining and directing nozzle mounted on said electrode support sleeve and having an imperforate internal surface of revolution concentric with the electrode and extending from the nozzle mounting on said sleeve beyond said gripping means toward the arc to form with the electrode an annular orifice, rigid annular walls outside of and concentric with the electrode disposed axially between the mounting of said nozzle on said sleeve and said annular orifice and forming an annular cooling chamber, cooling fluid passage means for passing cooling fluid into and out of said rigid walled annular cooling chamber, and means for supplying gas to the interior of said surface of revolution adjacent the mounting of said nozzle on said sleeve to flow axially along the annular gas passage between said surface of revolution and said electrode gripping means in heat interchange relation with the cooling fluid in said annular cooling chamber and therebeyond out through said annular orifice.

2. In a gas blanketed arc welding torch, an electrically conductive electrode support sleeve, an electrically conductive electrode engaging contactor mounted at the end of said sleeve toward the arc, means for supplying electric welding current through said sleeve and contactor and electrode, said sleeve having a gas passage portion extending longitudinally therethrough, a gas confining and directing nozzle mounted on said sleeve receiving gas from said longitudinal passage above said contactor and extending therebeyond toward the arc to form with the electrode an annular gas passage portion terminating in a discharge orifice, rigid confining walls above said orifice adjacent said contactor and outside of the electrode forming an arcuate cooling chamber a pair of said walls being arcuate and concentric with the electrode and radially spaced to confine said cooling chamber therebetween, and one of said rigid walls being mounted between said cooling chamber and said gas passage, whereby the gas flowing through said passage passes in contact with said cooling chamber wall.

3. In a gas blanketed arc welding torch, an electrically conductive electrode support sleeve, an electrically conductive electrode engaging contactor mounted at the end of said sleeve toward the arc, means for supplying electric welding current through said sleeve and contactor and electrode, said sleeve having a gas passage portion extending longitudinally therethrough, a gas confining and directing nozzle mounted on said sleeve receiving gas from said longitudinal passage portion above said contactor and extending therebeyond toward the arc to form with the electrode an annular gas passage portion terminating in a discharge orifice, rigid confining walls on said sleeve adjacent said contactor outside of the electrode forming an arcuate cooling chamber, a pair of said walls being arcuate and concentric with the electrode and radially spaced to confine said cooling chamber therebetween, and one of said rigid walls being mounted between said cooling chamber and said gas passage, whereby gas flowing through said gas passage passes in contact with said cooling chamber wall.

4. In a gas blanketed arc welding torch, an electrically conductive electrode support sleeve, an electrically conductive electrode engaging contactor mounted at the end of said sleeve toward the arc, means for supplying electric welding current through said sleeve and contactor and electrode, a gas confining and directing nozzle mounted on said sleeve and extending beyond said contactor toward the arc to form a discharge orifice, rigid annular walls mounted on said nozzle above said orifice and concentric with an electrode engaged by said contactor and forming an annular cooling chamber, and means for supplying gas to the torch above said contactor to flow therebeyond inside the inner wall of said cooling chamber inside said nozzle along the electrode and out through said orifice.

5. In a gas blanketed arc welding torch, an electrically conductive electrode support sleeve, an electrically insulated tubular outer shell and surrounding said sleeve, an electrically conductive electrode engaging contactor mounted at the end of said sleeve toward the arc, means for supplying electric welding current through said sleeve and contactor and electrode, a gas confining and directing nozzle mounted on said sleeve and extending beyond said contactor toward the arc to form a discharge orifice, rigid annular walls above said orifice adjacent said contactor and outside of and concentric with the electrode forming an annular cooling chamber, cooling fluid conduits passing inside said insulated shell for passing cooling fluid into and out of said chamber, and means for supplying gas to the torch above said contactor to flow therebeyond along said cooling chamber and along the electrode inside said nozzle and out through said orifice.

6. In a gas blanketed arc welding torch as claimed in claim 1, in which said annular walls are longitudinally spaced between said gripping means and said orifice.

7. In a gas blanketed arc welding torch, an electrically conductive electrode support sleeve, electrically conductive electrode gripping means mounted on said sleeve, said sleeve and gripping means having a substantially smooth external surface of revolution, means for supplying electric welding current through said support sleeve and gripping means to the electrode, a gas confining and directing nozzle mounted on said sleeve and having an internal surface of revolution concentric with the electrode and concentric with said external surface of revolution of said support sleeve and gripping means and spaced therefrom to form therewith an axially elongated annular gas passage unobstructed to gas flow, said internal surface of revolution extending beyond said gripping means toward the arc to form with the electrode an annular orifice, rigid annular walls outside of and concentric with the electrode and disposed axially intermediate the ends of said gas passage and forming an annular cooling chamber, cooling fluid passage means for passing cooling fluid into and out of said rigid walled annular cooling chamber, and means for supplying gas to the interior of said internal surface of revolution of said nozzle at the end of said annular gas passage remote from the arc to flow along said annular gas passage in heat interchange relation with the cooling fluid in said annular cooling chamber and therebeyond out through said annular orifice.

8. In a gas blanketed arc welding torch, an electrically conductive electrode support sleeve, an electrically conductive electrode engaging contactor mounted at the end of said sleeve toward the arc, means for supplying electric welding current through said sleeve and contactor and electrode, a gas confining and directing nozzle mounted on said sleeve and extending beyond said contactor toward the arc to form a discharge orifice, an annular cooling chamber mounted on said sleeve adjacent said contactor and concentric with an electrode engaged by said contactor, an annular cooling chamber mounted on said nozzle above said orifice, and means for supplying gas to the torch above said contactor to flow in succession along said sleeve cooling chamber and inside said nozzle cooling chamber along the electrode and out through said orifice.

9. In a gas blanketed arc welding torch, an electrode holder, electrically conductive electrode gripping means mounted at the end of said holder toward the arc, a nozzle mounted on said electrode holder and outside of said gripping means and extending therebeyond toward the arc to form with the electrode an annular gas passage terminating in an annular orifice, means for supplying electric welding current through said electrode holder and said gripping means to the electrode, an annular cooling chamber mounted above said orifice adjacent said gripping means and concentric with the outside of an electrode gripped by said gripping means, and means for supplying gas to the torch above said gripping means to flow therearound along the electrode inside said nozzle in heat interchange relation with the cooling medium in said chamber and therebeyond out through said annular orifice.

10. In a gas blanketed arc welding torch, an electrically conductive electrode support sleeve, an electrically conductive electrode engaging contactor mounted at the end of said sleeve toward the arc, means for supplying electric welding current through said sleeve and contactor and electrode, said sleeve having a gas passage portion extending longitudinally therethrough, a gas confining and directing nozzle mounted on said sleeve receiving gas from said longitudinal passage portion above said contactor and extending therebeyond toward the arc to form with the electrode an annular gas passage portion terminating in a discharge orifice, rigid arcuate walls on said sleeve adjacent said contactor concentric with the electrode forming an arcuate cooling chamber, cooling water conduits extending down along said sleeve and connected to said cooling chamber, terminal walls for said cooling chamber for directing the flow of cooling water from one conduit around the chamber to the other conduit, said terminal walls admitting gas from said passage therebetween, whereby gas flowing through said torch passes in contact with said cooling chamber terminal walls.

RUDOLPH T. BREYMEIER.

REFERENCES CITED

The following references are of record in the file of this patent:

UNITED STATES PATENTS

| Number | Name | Date |
| --- | --- | --- |
| 1,521,361 | Davis | Dec. 30, 1924 |
| 1,534,688 | Collins | Apr. 21, 1925 |
| 2,052,796 | Rava | Sept. 1, 1936 |
| 2,063,467 | Southgate | Dec. 8, 1936 |
| 2,106,692 | Embleton | Jan. 25, 1938 |
| 2,184,335 | Chapman | Dec. 26, 1939 |
| 2,216,564 | Chapman | Oct. 1, 1940 |
| 2,306,050 | Frischman | Dec. 22, 1942 |
| 2,376,265 | Meredith | May 15, 1945 |

FOREIGN PATENTS

| Number | Country | Date |
| --- | --- | --- |
| 128,301 | Austria | May 25, 1932 |